(12) United States Patent
Holzschuh

(10) Patent No.: US 9,044,833 B2
(45) Date of Patent: Jun. 2, 2015

(54) ROTOR SHAFT OF A TURBOMACHINE AND METHOD FOR THE PRODUCTION OF A ROTOR OF A TURBOMACHINE

(75) Inventor: Christian Holzschuh, Alzey (DE)

(73) Assignee: BorgWarner Inc., Auburn Hills, MI (US)

( * ) Notice: Subject to any disclaimer, the term of this patent is extended or adjusted under 35 U.S.C. 154(b) by 1184 days.

(21) Appl. No.: 12/996,856

(22) PCT Filed: Jun. 10, 2009

(86) PCT No.: PCT/US2009/046891
§ 371 (c)(1),
(2), (4) Date: Dec. 8, 2010

(87) PCT Pub. No.: WO2010/036425
PCT Pub. Date: Apr. 1, 2010

(65) Prior Publication Data
US 2011/0091324 A1    Apr. 21, 2011

(30) Foreign Application Priority Data
Jun. 19, 2008   (DE) .................. 10 2008 029 209

(51) Int. Cl.
| | | |
|---|---|---|
| B21K 25/00 | (2006.01) | |
| B23P 15/04 | (2006.01) | |
| B23P 15/00 | (2006.01) | |
| F01D 5/02 | (2006.01) | |
| F02C 6/12 | (2006.01) | |
| F02B 39/00 | (2006.01) | |

(52) U.S. Cl.
CPC ............ B23P 15/006 (2013.01); *Y10T 29/4932* (2015.01); F01D 5/025 (2013.01); F02B 39/00 (2013.01); F02C 6/12 (2013.01); *F05D 2230/21* (2013.01); *F05D 2220/40* (2013.01)

(58) Field of Classification Search
USPC .................. 29/889, 889.2, 889.5; 219/121.14, 219/121.12, 121.13, 121.35, 121.63, 121.64
See application file for complete search history.

(56) References Cited

U.S. PATENT DOCUMENTS

| | | |
|---|---|---|
| 6,291,086 B1 | 9/2001 | Nguyen-Dinh |
| 6,499,969 B1 | 12/2002 | Tombers et al. |
| 6,563,074 B2 * | 5/2003 | Bazukuri et al. ......... 219/121.14 |
| 2001/0027963 A1 | 10/2001 | Bazukuri et al. |
| 2006/0127243 A1 | 6/2006 | Vaccarezza et al. |
| 2008/0047344 A1 | 2/2008 | Gutknecht |

* cited by examiner

*Primary Examiner* — Richard Chang
(74) *Attorney, Agent, or Firm* — A. Michael Tucker; Stephan A. Pendorf; Patent Central LLC

(57) ABSTRACT

The invention relates to a rotor (1) of a turbomachine, in particular of an exhaust gas turbocharger, with a rotor wheel (2) which has a wheel back (3), and with a rotor shaft (4) which has an intermediate piece (5), via which the rotor shaft (4) is connected rigidly to the rotor wheel (2), the intermediate piece (5) being provided with a disk-shaped balancing plate (5A), the outside diameter (DA) of which is larger than the largest diameter (D4C) of the rotor shaft (4) and which is fixed to the wheel back (3) of the rotor wheel (2).

7 Claims, 15 Drawing Sheets

ROTOR SHAFT OF A TURBOMACHINE AND METHOD FOR THE PRODUCTION OF A ROTOR OF A TURBOMACHINE

The invention relates to a rotor of a turbomachine, in particular of an exhaust gas turbocharger, and to a method for the production of a rotor of this type.

A generic rotor is known from JP 11-320132 A, which describes a TiAl rotor with a turbine wheel consisting of a titanium aluminide alloy (TiAl alloy), which, using an intermediate piece consisting of a nickel-based alloy, is connected rigidly to a steel shaft. The tie-up of a turbine wheel consisting of TiAl to the intermediate piece is carried out by means of high-temperature soldering. The intermediate-piece/shaft tie-up takes place by means of electron beam welding (EB welding), but may also take place by means of friction welding.

As well as this complicated version EP 1002935 A describes a rotor, of which the turbine wheel consisting of a TiAl alloy is rigidly connected by friction welding, using a cylindrical intermediate piece, to the steel body which constitutes the bearing shaft. High mechanical strength is achieved in, that the intermediate piece consists at its end connected to the turbine wheel of a nickel-based or cobalt-based alloy. In order to reduce an undesirable heat flux from, the turbine wheel via the intermediate piece into the turbine-side bearing point in the steel body, the intermediate piece is constructed from a plurality of layers which are likewise built up by means of individual friction welding operations/steps. In this case, it should be noted that such a version, although providing a certain heat barrier in the direction of the turbine-side bearing, is nevertheless to be judged as uneconomic against the background of large series application on account of the high outlay in terms of handling and also because of the costs of the several individual steps.

A further prior art (EP 0368642 B1) describes a rotor of a turbomachine, the turbine wheel of which consists of a TiAl alloy and is connected to a steel shaft by means of friction welding via an intermediate piece consisting of a nickel-based or cobalt-based alloy.

What all the documents of the prior art have in common is that, although describing various joining methods for connecting a turbine wheel consisting of a TiAl alloy to a shaft consisting of an alloyed steel, using an intermediate piece, they nevertheless ignore an important aspect of the manufacturing steps necessary for producing a running component consisting of a TiAl alloy, this aspect relating to the balancing of the finished rotor.

All the known versions according to the prior art mentioned have the disadvantage that the balancing of the rotor, as an individual part, has to be carried out on the brittle TiAl alloy of the turbine wheel, which has a high fault potential (crack inducement) and therefore drastically reduces the useful life of the component.

What all the versions according to the prior art have in common, furthermore, is that, although the use of cylindrical intermediate pieces as a connection of a shaft consisting of steel and of a turbine wheel consisting of a TiAl alloy is described, these versions do not make it possible to carry out any balancing removal on the intermediate piece in order to balance the component within the currently acceptable limits for rotors of a turbomachine.

Moreover, all the versions according to the prior art have in common that a necessary balancing method always has to be carried out in 2 planes in the TiAl alloy (irrespective of the position of the balancing mark in the component), along with the above-described disadvantages with regard to strength.

The object of the present invention, therefore, is to provide a rotor and a method for the production of a rotor of this type, which allow a balancing of the rotor, at least largely free of damage, in a technically simple and reliable way.

According to the invention, therefore, there is the possibility of using an intermediate piece as a connection element of the rotor shaft (steel shaft) and rotor wheel (in particular, in the form of a turbine wheel consisting of TiAl), and a geometric design of the intermediate piece, preferably in the form of a disk, such that balancing can be carried out on the wheel back of the rotor wheel in the intermediate piece by means of balancing methods known per se.

That is to say, the intermediate piece, preferably on the basis of a nickel-based or cobalt-based alloy, combines two functions in one component:

- connection of a turbine wheel consisting of an intermetallic titanium aluminide alloy (TiAl) to a shaft consisting of steel, and
- balancing of the rotor, using economical balancing processes.

The subclaims contain advantageous developments of the rotor and of the method according to the invention.

According to the invention, the disadvantages of the prior art can be correspondingly eliminated by means of preferably optimized geometries of the intermediate piece, which means, in other words, that a shift of special regions required for balancing out of the turbine wheel into the geometry of the intermediate piece is possible.

Owing to the separation of the manufacturing steps of the assembling of the rotor wheel (turbine wheel) with the intermediate piece and of connecting this assembly to the rotor shaft in a separate work step, a highly efficient process for joining the entire rotor takes place, which is dealt with in more detail below.

Illustration of a Composite Structure Consisting of Rotor Wheel and Intermediate Piece (without Shaft):

The tie-up of the intermediate piece consisting of a nickel-based or cobalt-based alloy to the turbine wheel consisting of a TiAl alloy may take place by means of friction welding, CD welding or high-temperature soldering.

The high-temperature soldering, which constitutes the advantageous form of the connection of the turbine wheel consisting of TiAl to the intermediate piece consisting of a nickel-based or cobalt-based alloy, may take place relatively cost-effectively, on account of the compact type of construction of the turbine wheel and intermediate piece, as a vacuum-soldering process, for example in a furnace with high load utilization, the strength of the nickel-based or cobalt-based alloy of the intermediate piece being preserved. In this case, the lowest possible mechanical forces act on the brittle TiAl alloy during the joining process. Moreover, the ductility of the TiAl alloy is increased as a result of the temperature necessary for the soldering process. However, the temperature management of the soldering process must be set such that the temperatures occurring during the joining process and the necessary times do not cause a reduction in strength of the TiAl alloy on account of undesirable phase transformations.

Making the intermediate piece from a nickel-based or cobalt-based alloy is advantageous furthermore, because there is no reduction in the annealing stage of the material of the intermediate piece. It is known that, in the direct soldering (with or without a vacuum) of a shaft consisting of a high-alloy steel to a turbine wheel consisting of a titanium aluminide alloy, the annealing (strength) of the shaft material is reduced or broken down. A subsequent annealing of the entire connected rotor is possible, but this method is uneconomic, and high thermal distresses and distortions appear in the component which do not ensure an efficient further processing of the component.

It advantageously becomes apparent, furthermore, that, due to the use of an intermediate piece consisting of a nickel-based or cobalt-based alloy, not only is a rotor of high mechanical strength both at room temperature and at temperatures of up to 700° C. made possible, but also a rotor can be balanced with high process reliability within the necessary balancing limits of present-day exhaust gas turbocharger rotors.

Moreover, the soldered connection of an intermediate piece consisting of a nickel-based alloy to a turbine wheel consisting of a TiAl alloy can be implemented more efficiently, while preserving the strength, because of the smaller construction space of the components to be connected (simple tension means) than, for example, the soldered connection of a steel shaft directly to a component consisting of a TiAl alloy.

An advantageous version is vacuum soldering by means of electron beam heating which can be carried out with adapted parameters on conventional electron beam welding installations. The introduction of heat by means of the beam advantageously takes place on the intermediate piece (with a focused or defocused EB beam). The beam parameters are to be selected as a function of the form and mass of the component. A defined pretensioning of the components ensures that the components are fixed in the correct position during the soldering operation, while at the same time the components rotate. The operation is maintained until a uniform full heating of the two parts to be connected, namely the turbine wheel and intermediate piece, and the liquidous phase of the solder between the turbine wheel and intermediate piece are achieved. Brief holding at a temperature above the melting temperature of the solder ensures that a complete wetting of the two joining partners is obtained.

Heating by EB beam takes place, in terms of the method, in a vacuum and therefore has the advantage that no undesirable reactions of the components to be connected occur, in particular, the reactivity of the TiAl with atmospheric oxygen is prevented. Moreover, no atmosphere consisting of an inert gas or reduction gas is necessary for the process.

Alternatively, the tie-up of the intermediate piece to the turbine wheel may take place by soldering without a vacuum, by the two parts being heated by means of a high-frequency (HF) heat source in an atmosphere of inert gas or reduction gas (for example, argon).

A further possibility for soldering without a vacuum is the heating of the components and, along with this, the heating of the solder into the liquidous phase by means of a laser beam.

Illustration of the Entire Rotor (Including Shaft):

The efficiency of the method of joining the entire rotor is achieved due to the possibility of using conventional methods, such as friction welding, electron beam welding, laser welding, CD welding and high-temperature soldering, for connecting the intermediate piece or the composite structure of turbine wheel, including intermediate piece, to the shaft.

An advantageous version describes connection by means of electron beam welding.

The connection of the intermediate piece or of the composite structure of turbine wheel, including intermediate piece, to the shaft consisting of steel is carried out on conventional EB welding installations which can be operated with similar welding parameters to those in the EB welding of a shaft consisting of steel to a turbine wheel consisting of a nickel-based alloy.

The following possibility for producing the entire rotor arises as a particular feature as a consequence of the process employed. All the components of the entire rotor (turbine wheel consisting of TiAl, intermediate piece consisting of a nickel-based or cobalt-based alloy, shaft consisting of steel) are introduced into an adapted fixture in the EB welding machine and are fixed in the correct position by means of a defined pretension during the work steps (soldering and welding). Additional geometric implementations, such as fits between the components to be connected, are possible. The soldered connection of the turbine wheel and of the intermediate piece is carried out in one work step by means of an electron beam. The EB welding of the intermediate piece and of the shaft consisting of steel takes place in a further work step.

Shaft with Integrated Intermediate Piece:

An advantageous embodiment of the present invention in the form of the TiAl rotor goes one step further and reduces the number of parts by combining the intermediate piece and the shaft into one component consisting of a nickel-based or cobalt-based alloy which is connected to the turbine wheel consisting of TiAl by means of high-temperature soldering. An advantageous refinement of this combination of shaft and intermediate piece may be implemented, for example, in a forging process (forming process), extrusion process, lost-wax casting process or the metal injection molding method (MIM method).

Balancing:

The balancing of the rotor advantageously takes place on the side of the wheel back solely on the intermediate piece which, by virtue of its geometric design in the form of a cylindrical disk, makes available the region necessary for the process of balancing the rotor. It becomes clear furthermore, that, with the cylindrical outside diameter of the intermediate piece being enlarged, the mass moment of inertia of the rotor is increased.

An advantageous version of the intermediate piece describes an outside diameter $D_A$ which is smaller than or equal to the inlet diameter of the hub of the turbine wheel. Owing to the markedly higher density of the intermediate piece consisting of a nickel-based or cobalt-based alloy, as compared with the turbine wheel consisting of a TiAl alloy (ratio of the density of a nickel-based or cobalt-based alloy to that of a TiAl alloy is 2:1), it becomes possible that a rotor with a turbine wheel consisting of a TiAl alloy can be brought, even on a reduced balancing radius, by the removal of material (possible balancing methods: milling, grinding, erosion) into the required limits with regard to the balancing of the rotor as an individual part.

Balancing milling can be automated and consequently can be carried out economically by means of the simple turbine wheel/intermediate piece version.

In summary, above all, the following advantages arise:

Efficient connection (by means of high-temperature soldering in a vacuum furnace, friction welding, CD welding, vacuum soldering process by electron beam, soldering without a vacuum by heating by means of HF heat source or laser in an atmosphere consisting of inert gas or reduction gas) of a turbine wheel preferably consisting of a TiAl alloy to an intermediate piece preferably consisting of a nickel-based or cobalt-based alloy, with the strength of the intermediate piece being preserved during the joining process.

Use of the intermediate piece:
to connect a TiAl turbine wheel to a steel shaft,
to reduce the heat flux from the turbine side into the bearing point located nearest to the turbine side when the rotor is in operation, for balancing the entire rotor, using efficient, automatable balancing processes, such as milling, grinding or erosion.

Possibility of the advantageous, efficient combination (since the number of components is reduced) of shaft and intermediate piece into one component consisting of a nickel-based or cobalt-based alloy, with the possibility of the described efficient method of balancing the rotor being maintained.

In addition to the one-part version of the intermediate piece, as described, there is additionally the possibility of also having a multi-part design of the intermediate piece or, by means of optional manufacturing methods, of producing further alternative combinations of shaft and intermediate piece or intermediate piece and turbine wheel.

These exemplary embodiments will be described in more detail below.

Composite intermediate piece produced by the MIM method (MIM: Metal Injection Molding)

The composite intermediate piece consists of at least two parts of different materials which are connected into one component by the MIM method. An advantageous version of this composite intermediate piece combines a nickel-based or cobalt-based alloy with a steel alloy.

By materials of different physical properties being combined in a composite intermediate piece, what is achieved, when the steel shaft is subsequently connected to the composite intermediate piece and to the turbine wheel consisting of a TiAl alloy, is that materials having similar physical properties are connected to one another, this having a positive effect on the process.

Moreover, if there is an appropriate selection for the materials of the multi-part composite intermediate piece, there is the possibility of providing an accurately graded transition between the individual materials of the components of the entire rotor. This, on the one hand, affords advantages with regard to the conduction of heat into the shaft, and, on the other hand, gives the expectation that, owing to the coordinated coefficients of thermal expansion of the individual components of the rotor, the stresses under the action of temperature while the rotor is in operation are reduced.

Further advantageous versions:

the turbine wheel is constructed as a composite turbine wheel from 2 different materials, advantageously from a titanium aluminide alloy and a nickel-based or cobalt-based alloy;

the intermediate piece is produced from a nickel-based or cobalt-based alloy and by the MIM method. The turbine wheel too, is produced from a titanium aluminide alloy and likewise by the MIM method. The combination of the two parts into the composite turbine wheel is likewise carried out by the MIM method;

the intermediate piece consisting of a nickel-based or cobalt-based alloy is produced by forging or lost-wax casting. The turbine wheel consisting of a TiAl alloy is produced by the MIM method. The composite structure of turbine wheel and intermediate piece is likewise obtained by the MIM method;

the intermediate piece consisting of a nickel-based or cobalt-based alloy is produced by the MIM method. The turbine wheel consisting of a titanium aluminide alloy is produced by the lost-wax or centrifugal casting process. The composite structure of turbine wheel and intermediate piece is obtained by the MIM method;

the intermediate piece consisting of a nickel-based or cobalt-based alloy is produced by the MIM method. The turbine wheel consisting of a titanium aluminide alloy is produced by the lost-wax or centrifugal casting process. The composite structure of turbine wheel and intermediate piece is obtained by the lost-wax or centrifugal casting method;

the intermediate piece consisting of a nickel-based or cobalt-based alloy is produced by forging or lost-wax casting. The turbine wheel consisting of a titanium aluminide alloy is produced by the lost-wax or centrifugal casting process. The composite structure of turbine wheel and intermediate piece is likewise obtained by the lost-wax or centrifugal casting method;

the intermediate piece and the shaft are both produced from a nickel-based or cobalt-based alloy as a composite component by forging or lost-wax casting. The turbine wheel consisting of a titanium aluminide alloy is produced by the lost-wax or centrifugal casting process. The rotor is produced by means of a composite casting (lost-wax or centrifugal casting) of the turbine wheel and shaft/intermediate-piece combination in the region of the intermediate piece;

a multi-part intermediate piece consisting of different materials (at least two) is produced by the MIM method. The turbine wheel consisting of a titanium aluminide alloy is produced by the MIM method. The composite structure of a multi-part intermediate piece and the turbine wheel is obtained by the MIM method. Combinations of the versions described above are possible according to the invention.

Further details, advantages and features of the present invention may be gathered from the following description of exemplary embodiments, with reference to the drawing in which.

Figure 3:
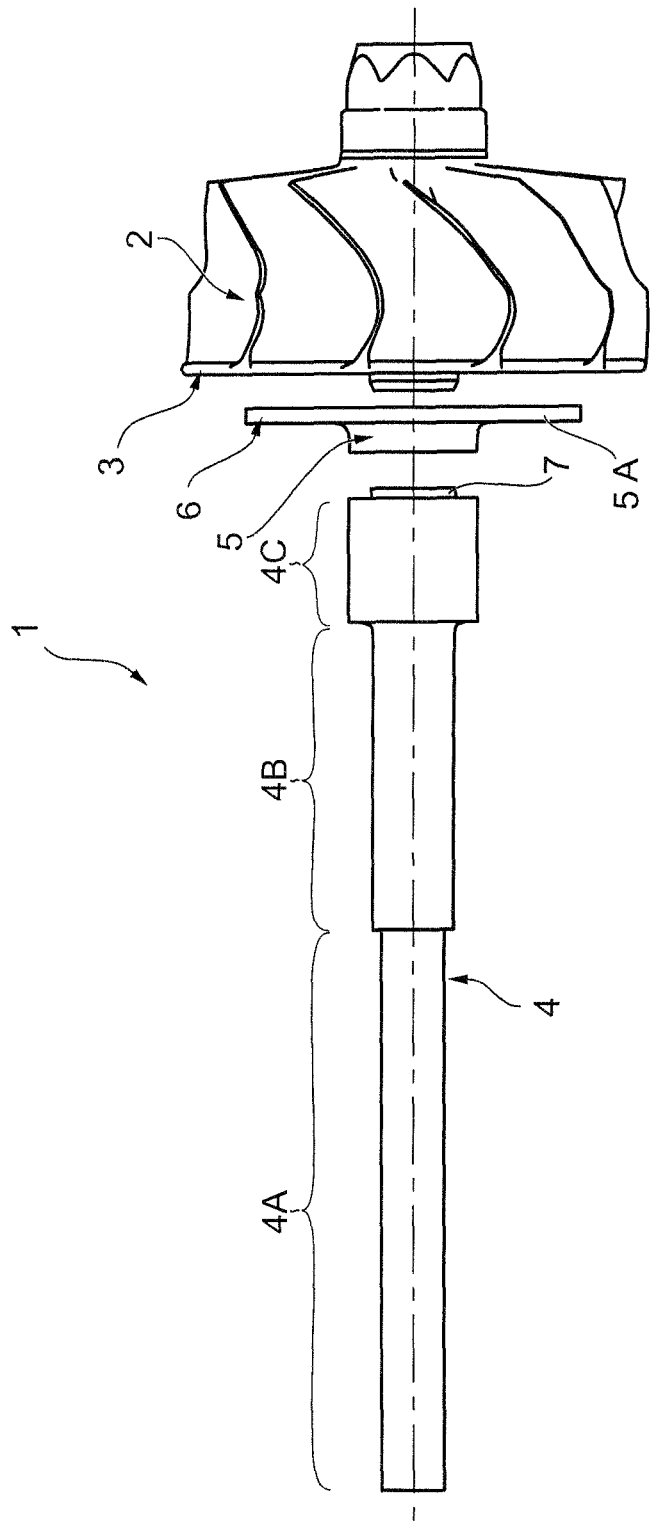
FIG. 3 shows an illustration, corresponding to FIG. 1, of a second embodiment.
Figure 5:
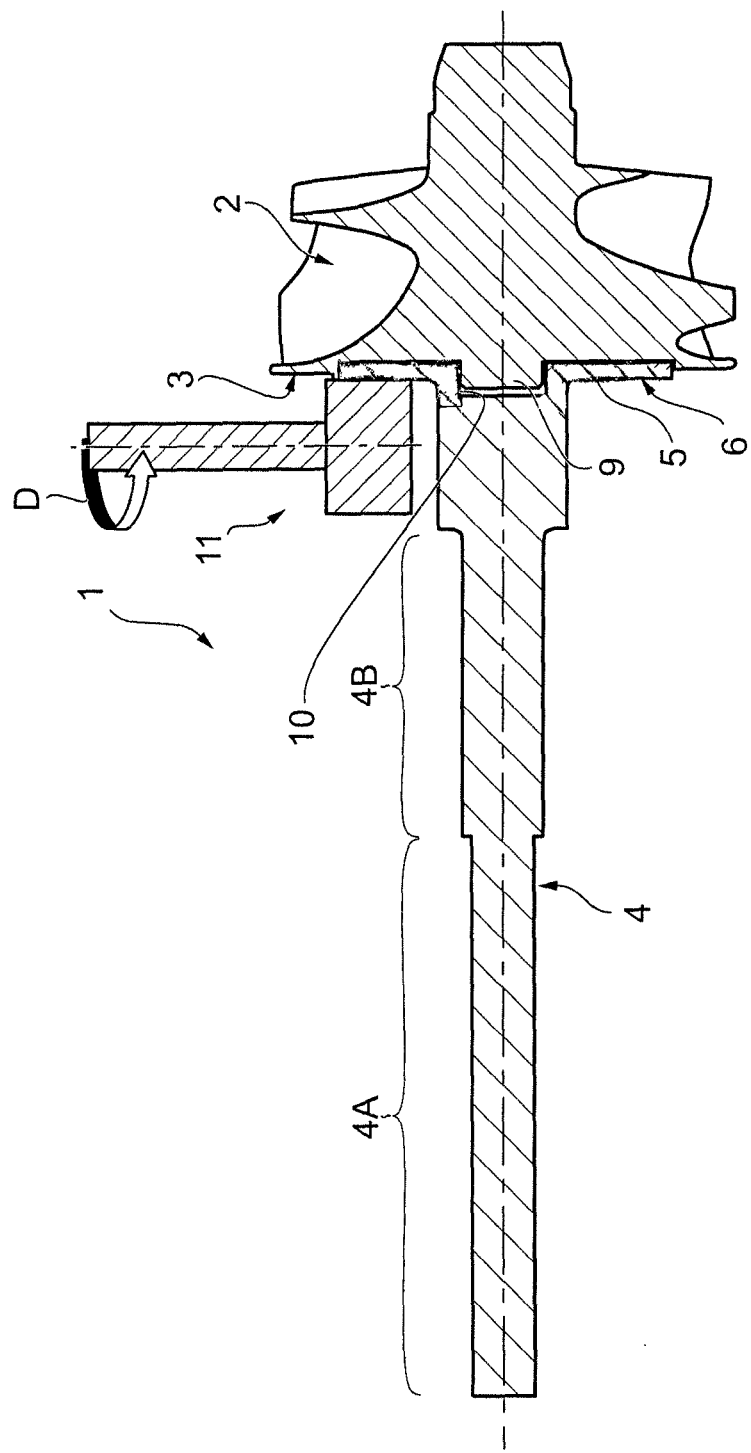
FIG. 5 shows an illustration, corresponding to FIGS. 2 and 4, of a third embodiment of the rotor according to the invention (one-piece composite structure of shaft and intermediate piece)
Figure 6:
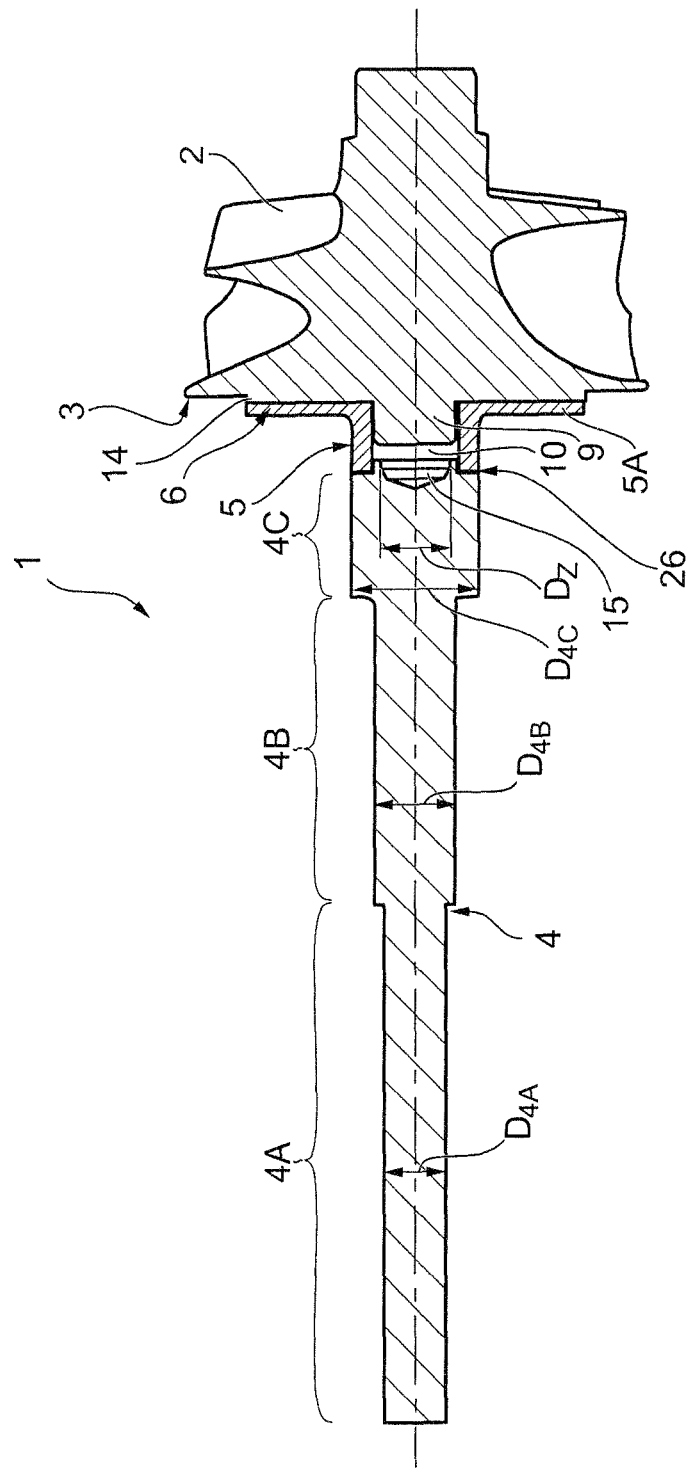
FIG. 6 shows an illustration, corresponding to FIGS. 2 and 4, of a fourth embodiment of the rotor according to the invention.
Figure 14A:
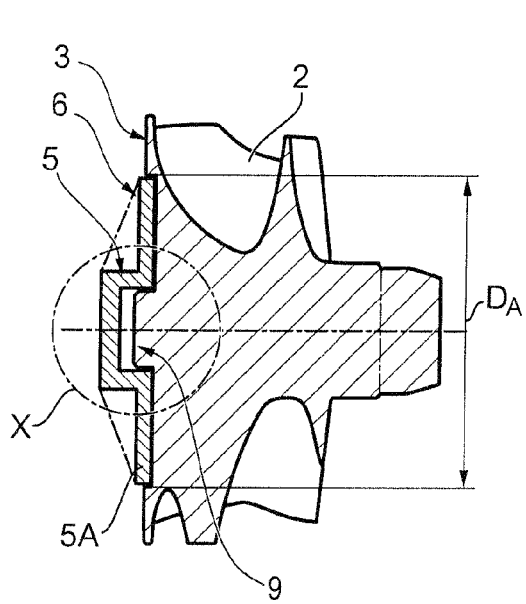
Figure 15:
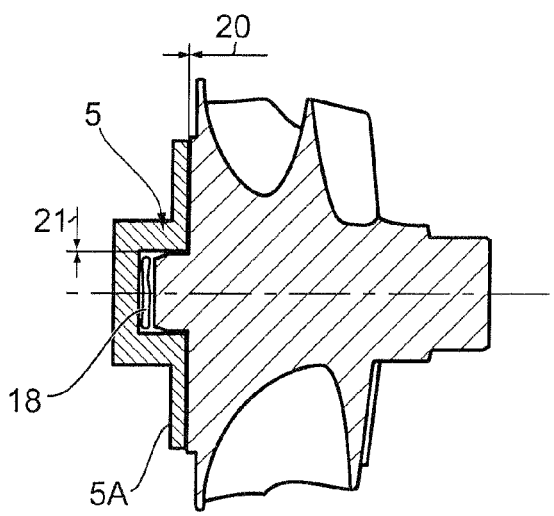
Figure 16:
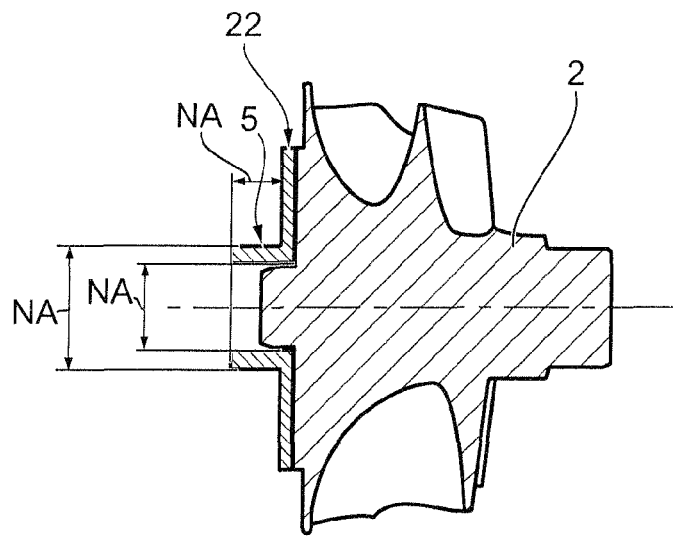
Figure 17:
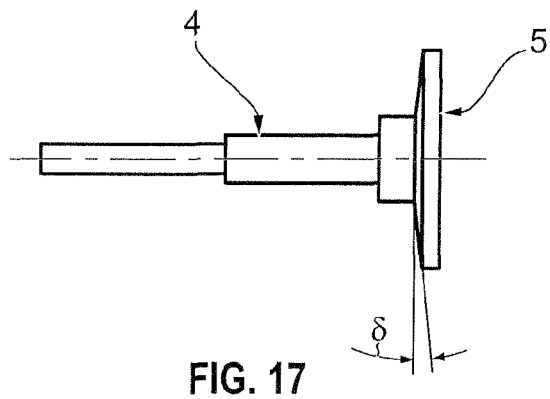
Figure 18:
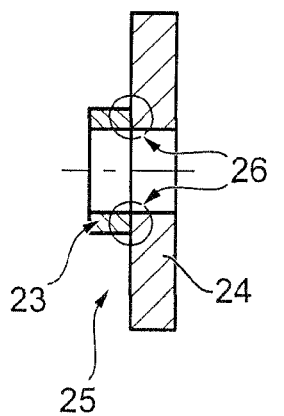
Figure 19:
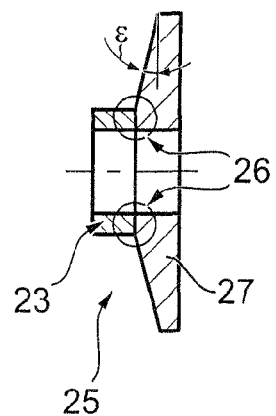
Figure 20:
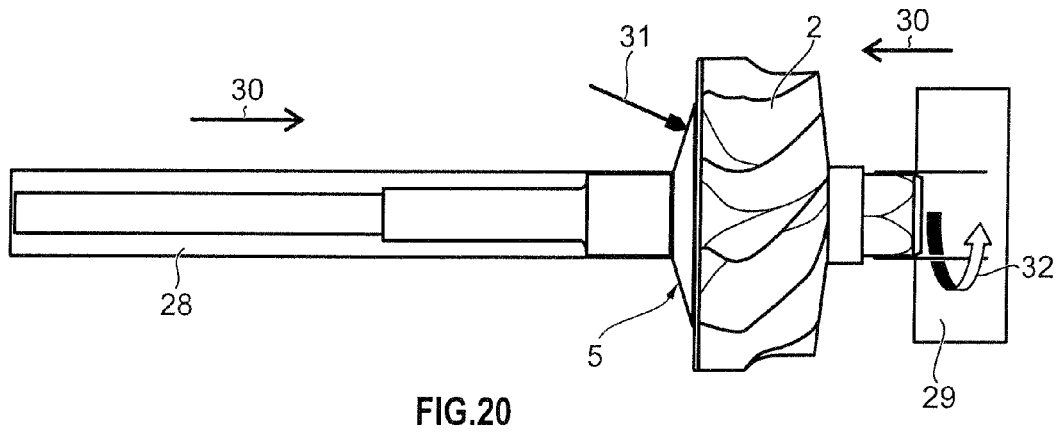
Figure 21:
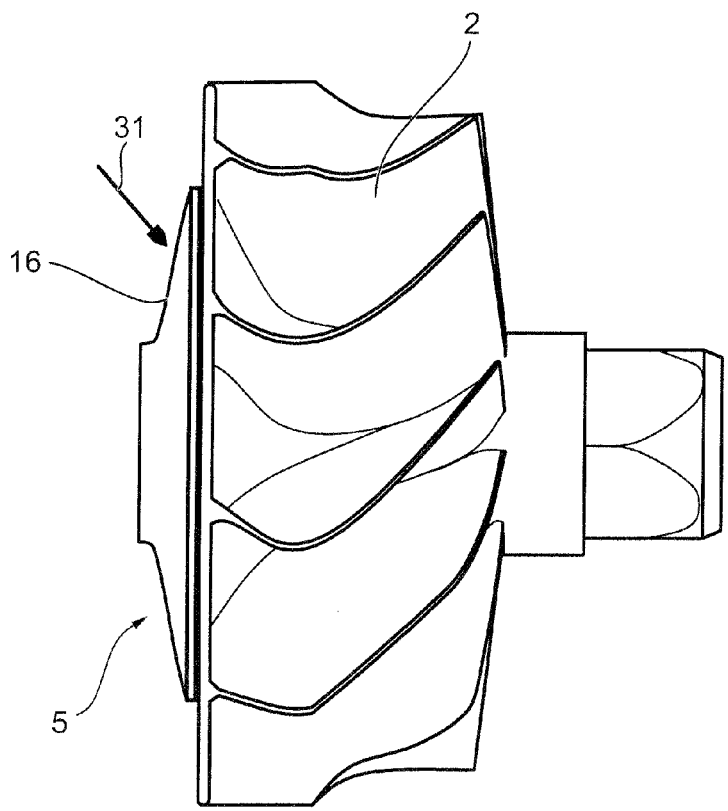
Figure 22:
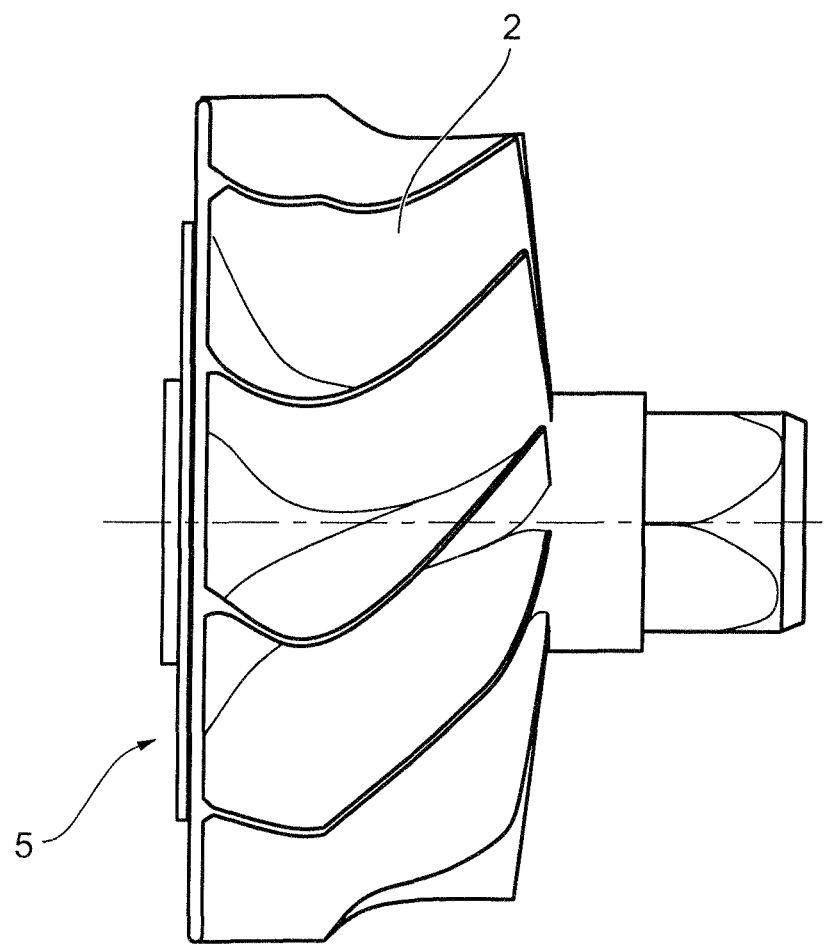

FIG. 14A, B show alternative geometries of the intermediate piece of the rotor from FIG. 3;

FIG. 15 shows an alternative geometry of the intermediate piece of the rotor from FIG. 6, illustrated in the process of joining the intermediate piece to the turbine wheel;

FIG. 16 shows a turbine-wheel/intermediate-piece composite structure from FIG. 15, illustrated as a reworking of the basic composite structure from FIG. 15 (introduction of the intermediate-piece/shaft tie-up geometry);

FIG. 17 shows an illustration of a further version of the combination of shaft and intermediate piece from FIG. 5;

FIG. 18 shows an illustration of a multi-part intermediate piece;

FIG. 19 shows an illustration of a design variant of the intermediate piece from FIG. 18;

FIG. 20 shows a greater simplified diagrammatic illustration of the process of the EB soldering or heating of the intermediate piece 5 and the rotor wheel by means of the EB beam;

FIG. 21 shows an enlarged part view of the composite structure, described in FIG. 20, of intermediate piece 5 and rotor wheel 2 in the state of or after soldering by means of the EB beam; and FIG. 22 shows an enlarged part view of the composite structure, illustrated in FIG. 21, of a reworked geometry of the intermediate piece 5.

Figure 1:
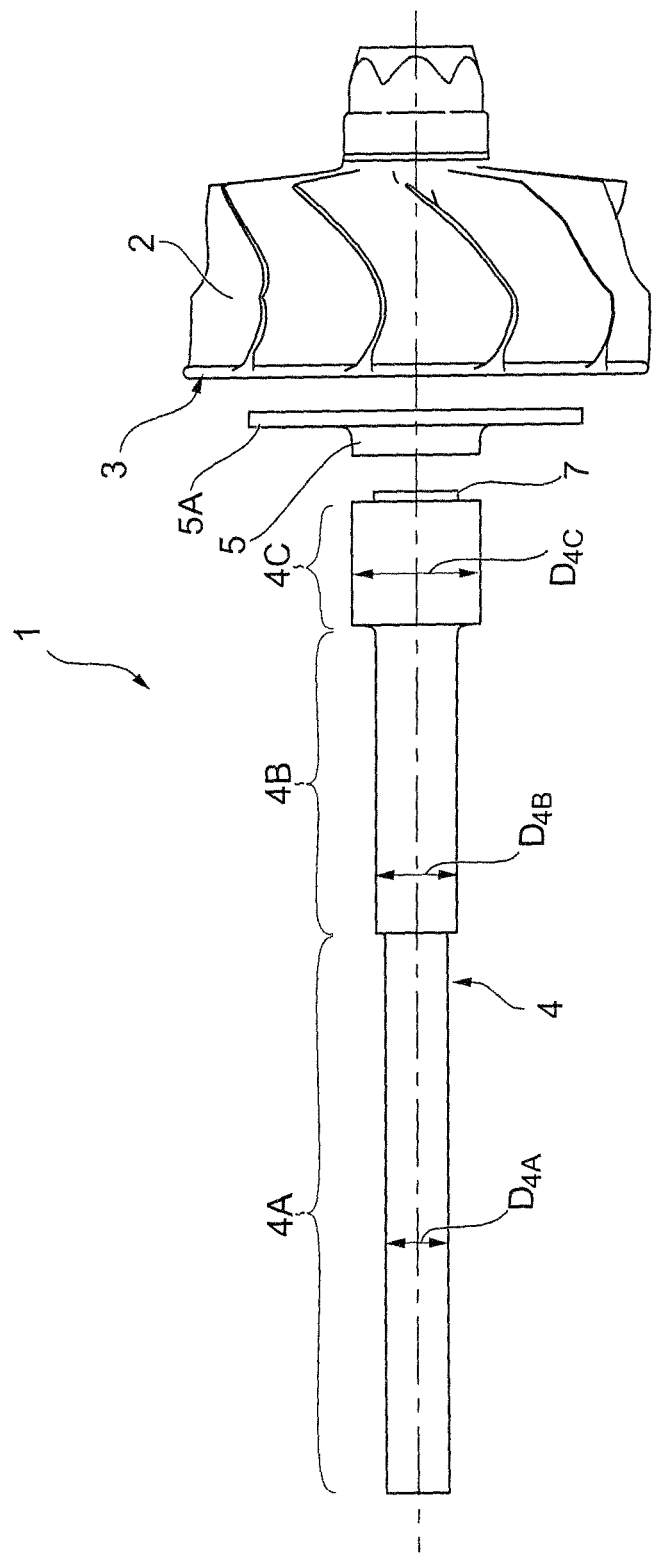
FIG. 1 shows a first embodiment of a rotor according to the invention in a diagrammatically slightly simplified illustration.

FIG. 1 illustrates a first embodiment of a rotor 1 according to the invention of a turbomachine, which may, for example, be an exhaust gas turbocharger. The rotor 1 has a rotor wheel 2 which, in the case of the exhaust gas turbocharger, may, for example, be the turbine wheel. The rotor wheel 2 has a wheel back 3. The rotor 1 has, furthermore, a rotor shaft 4 which is fixed to the rotor wheel 2 via an intermediate piece 5. In the example illustrated, the rotor shaft 4 has three shaft portions 4A, 4B and 4C with assigned diameters $D_{4A}$, $D_{4B}$ and $D_{4C}$, the shaft portion 4C comprising the largest diameter.

Figure 2:
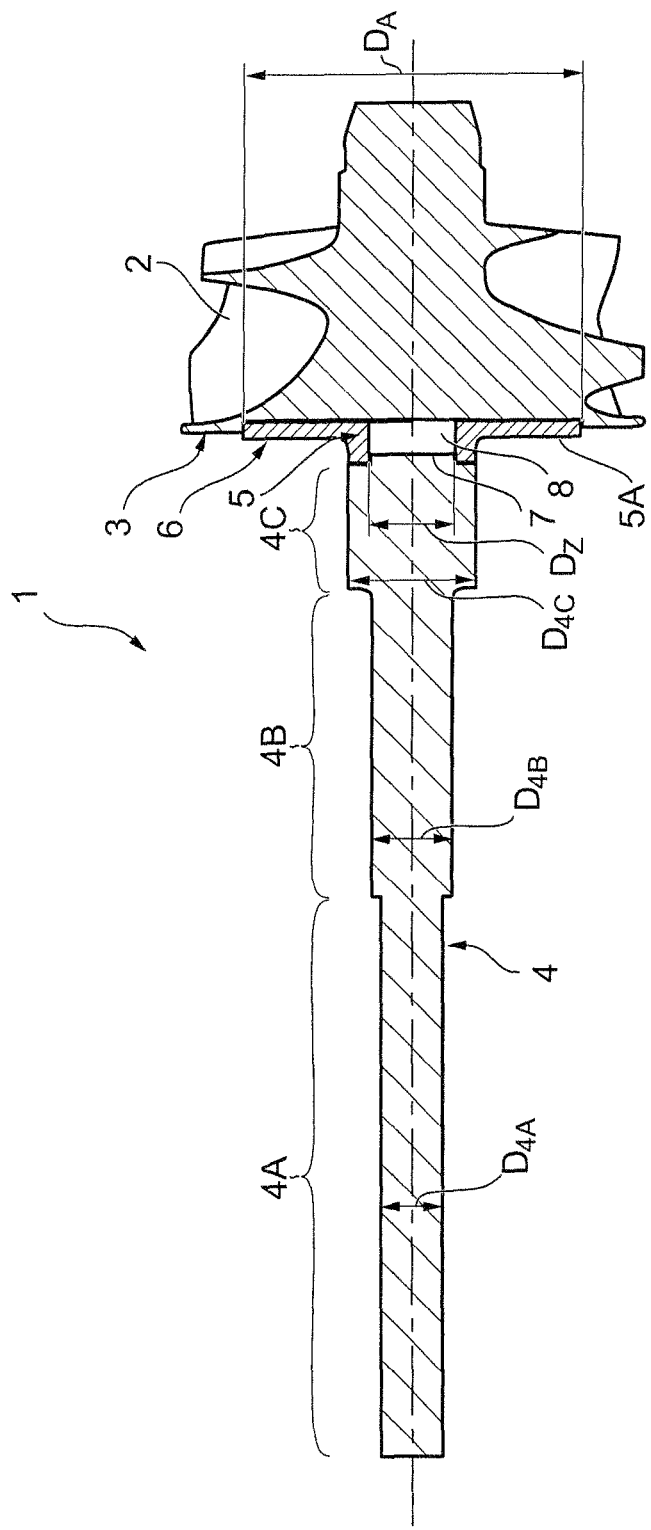
FIG. 2 shows a sectional illustration of a first embodiment of a rotor according to the invention.

FIG. 2 illustrates the rotor from FIG. 1 in section for a clearer understanding. The intermediate piece 5 has a cavity 8 with a bore diameter $D_Z$ which is smaller than the diameter $D_{4C}$ of the rotor shaft. The rotor shaft 4 has a tie-up journal 7 which engages in the cavity 8 of the intermediate piece 5, this cavity 8 forming, if appropriate with a cavity arranged in the rotor shaft, but not visible in FIG. 2, a heat throttle. The intermediate piece 5 is arranged in a depression of the wheel back 3, this being dealt with in more detail later (alternatively, on a projection). In the embodiment illustrated in FIG. 2, the rotor wheel or turbine wheel 2 may consist of a TiAl alloy, whereas the intermediate piece 5 may consist of an Ni/Co-based alloy and the rotor shaft 4 of a high-alloy or low-alloy steel. The rotor wheel 2 and the intermediate piece 5 may be connected to one another by means of high-temperature soldering. The rotor shaft 4 and the intermediate piece 5 may be connected to one another by means of an EB-welding operation.

Alternatively to this, it is possible that the rotor shaft 4 and the intermediate piece 5 are connected to one another by means of a friction-welding process or a capacitor discharge welding process (CD welding process). The tie-up of the intermediate piece to the rotor wheel may likewise take place by means of a CD welding operation.

The heat throttle may, furthermore, comprise a bore in the shaft 4 and in the intermediate piece 5.

As may be gathered from FIG. 2, the outside diameter $D_A$ of the intermediate piece is larger than the diameters $D_Z$ and also $D_{4A}$, $D_{4B}$ and $D_{4C}$. It delimits radially outward a balancing region 6 possible on the intermediate piece. As FIG. 2 makes clear, the rotor shaft 4 and the intermediate piece 5 are two separate, but interconnected components. Advantageous versions in terms of the number of parts by the combination of the two components are dealt with later.

In the embodiment according to FIG. 3, the rotor shaft 4 and the intermediate piece 5 are separate one-piece components, as is already clear in FIG. 1. In this version, too, the rotor shaft 4 is connected to the rotor wheel 2 via the intermediate piece 5.

Figure 4:
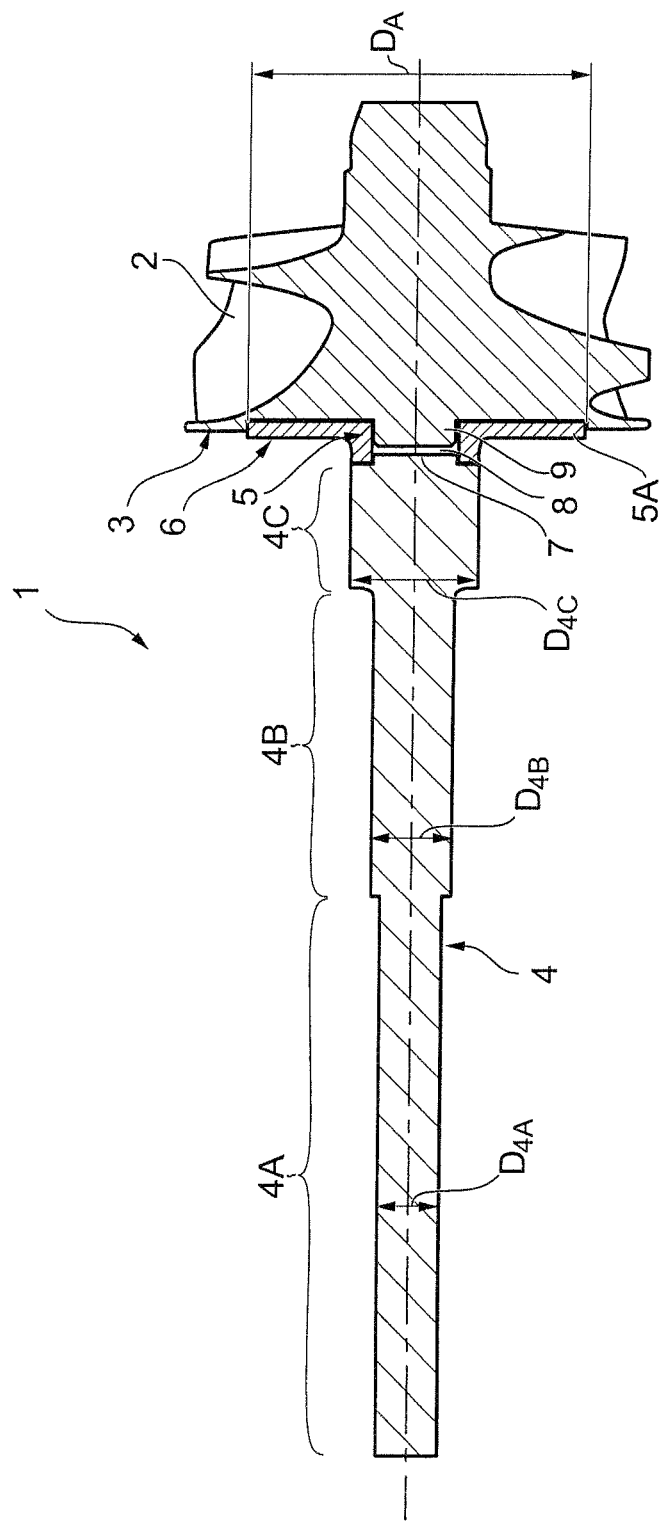
FIG. 4 shows an illustration, corresponding to FIG. 2, of a second version.

FIG. 4 illustrates the rotor from FIG. 3 in section for clearer understanding. As may be gathered from the illustration of FIG. 4, here, too, the rotor shaft 4 and the intermediate piece 5 are in the form of a one-part version, once again a depression, but here with a centering tenon 9, being provided in the wheel back 3. The centering tenon 9 engages into a correspondingly formed centering recess 10 of the bore or the cavity 8 in the intermediate piece 5. The parts of the embodiment according to FIG. 4 which are given the same reference numerals as in FIG. 2 otherwise correspond to those of the first embodiment, and therefore reference may be made to the preceding description.

A third embodiment of the rotor 1 according to the invention is illustrated in FIG. 5. Here, the rotor shaft 4 and the intermediate piece 5 are in the form of a one-part or one-piece version, once again a depression, but here with a centering tenon 9, being provided in the wheel back 3. The centering tenon 9 engages into a correspondingly formed centering recess 10 in the intermediate piece 5. Furthermore, FIG. 5, by illustrating a balancing tool 11 with its direction of rotation D, makes clear how the balancing operation can be carried out according to the invention. The balancing tool 11, designed particularly as a balancing milling cutter, can introduce, distributed radially on the circumference, at least one balancing mark on the balancing region 6, in order to balance the entire component of the rotor 1 in this plane within the required limits of this plane.

FIG. 6 illustrates a fourth embodiment of the rotor 1 according to the invention in section. The rotor shaft 4 and the intermediate piece 5 are formed in a one-part version, no depression, but, instead, an elevation 14, being provided in the wheel back 3. Furthermore, a centering tenon 9 is also illustrated. The centering tenon 9 engages into a correspondingly formed centering recess 10 of the bore $D_Z$ in the intermediate piece 5. The rotor shaft 4 has an additional cavity 15 which serves as a heat throttle. Alternatively, the rotor shaft may also be produced without the additional cavity 15.

Figure 7:
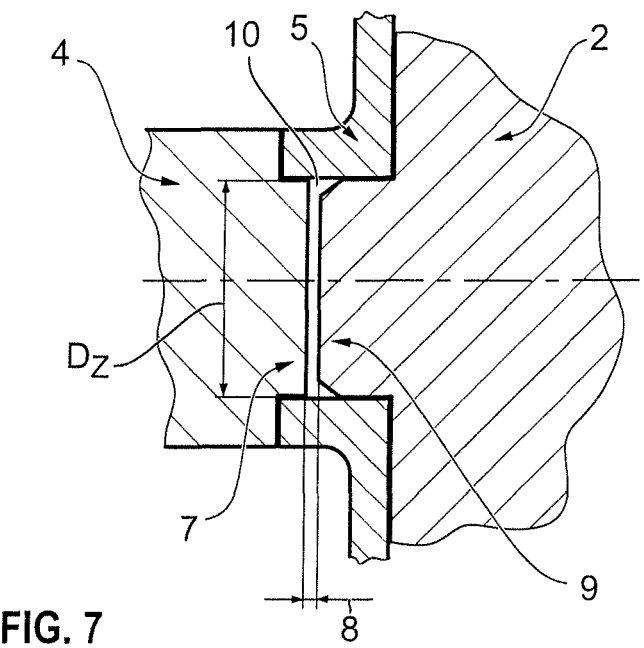
FIG. 7 shows an enlarged part view of the rotor according to FIG. 2.

FIG. 7 indicates in an enlarged illustration the tie-up region with the centering tenon 9 and the (centering) recess 10 which, with an appropriate design, may have a heat throttle effect. Moreover, the cavity 8 which is formed when the components are joined together is illustrated.

Figure 8:
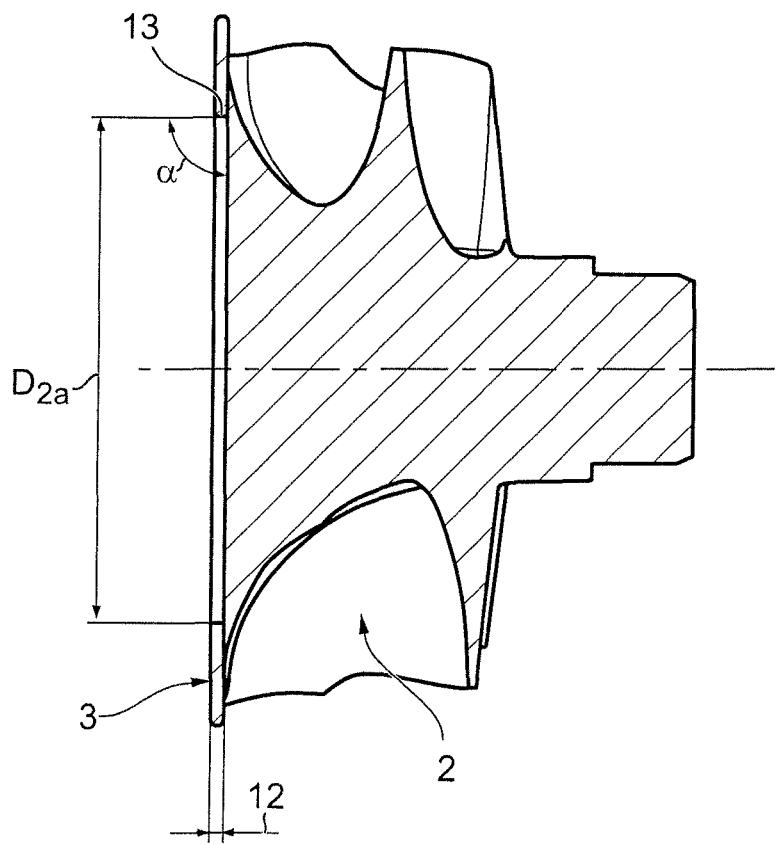
FIG. 8 shows an illustration of a first design variant of a rotor wheel.

FIG. 8 illustrates a design variant of the rotor wheel 2 which makes clear the placing of the depression 12, already mentioned above, in the wheel back 3 for receiving the intermediate piece 5. Reference should be made, in particular, to the angle α of the outermost end region 13 of the depression 12 which, in the example, amounts to about 90°. The diameter $D_{2a}$ is to be selected such that an outer centering of the diameter $D_A$ of the intermediate piece 5 becomes possible.

Figure 9:
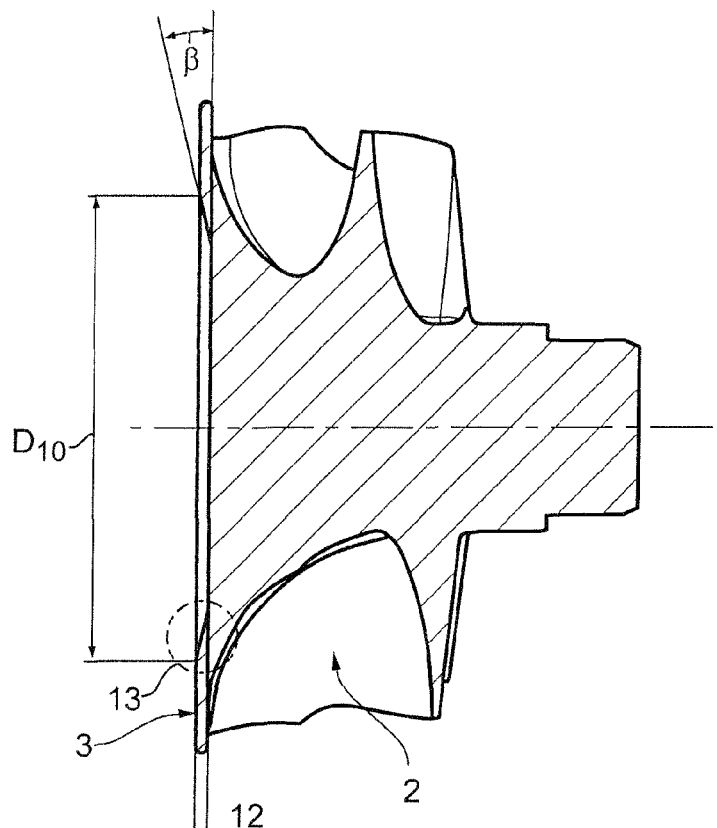
FIG. 9 shows an illustration, corresponding to FIG. 8, of a second design variant of the rotor wheel.

FIG. 9 illustrates a second design variant of the rotor wheel 2 from FIG. 8 which again has the depression 12 in the wheel back 3. The angle β of the end region 13 of the depression 12 may lie here in a range of 90° to 170°.

Figure 10:
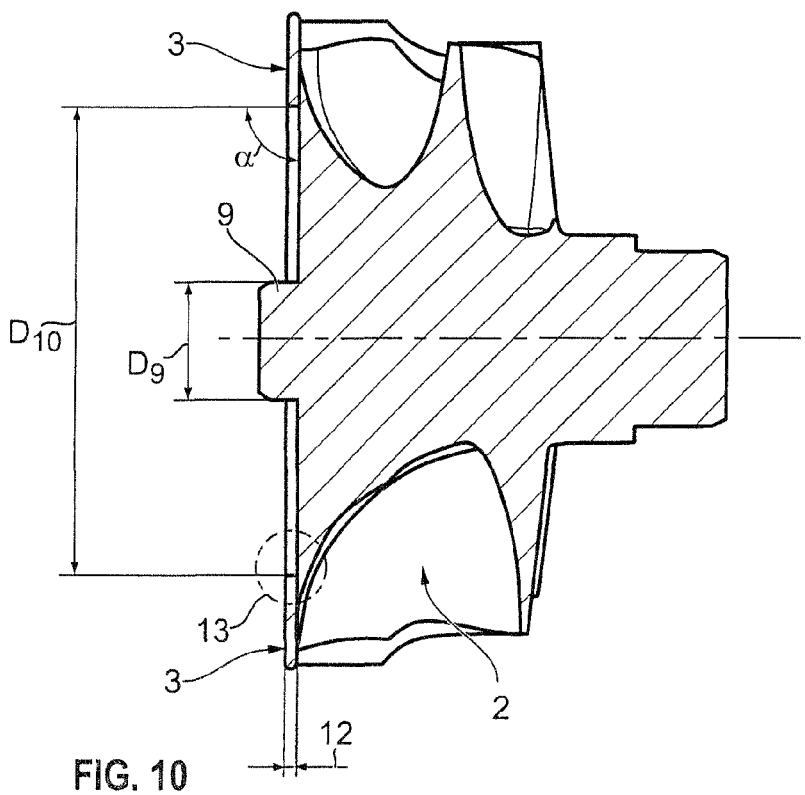
FIG. 10 shows an illustration of a third design variant of the rotor wheel.

FIG. 10 illustrates a third design variant of the rotor wheel 2 which again has the depression 12 in the wheel back 3 provided with the centering tenon 9. The angle α of the outermost end region 13 of the depression 12 amounts to about 90° in the example. The diameters $D_9$ of the tenon 9 and $D_{10}$ of the depression 12 are coordinated with the bore diameter $D_Z$ and outside diameter $D_A$ of the intermediate piece 5 such that no forced state arises during the joining of the components, but at the same time the soldering flux is maintained and made possible.

Figure 11:
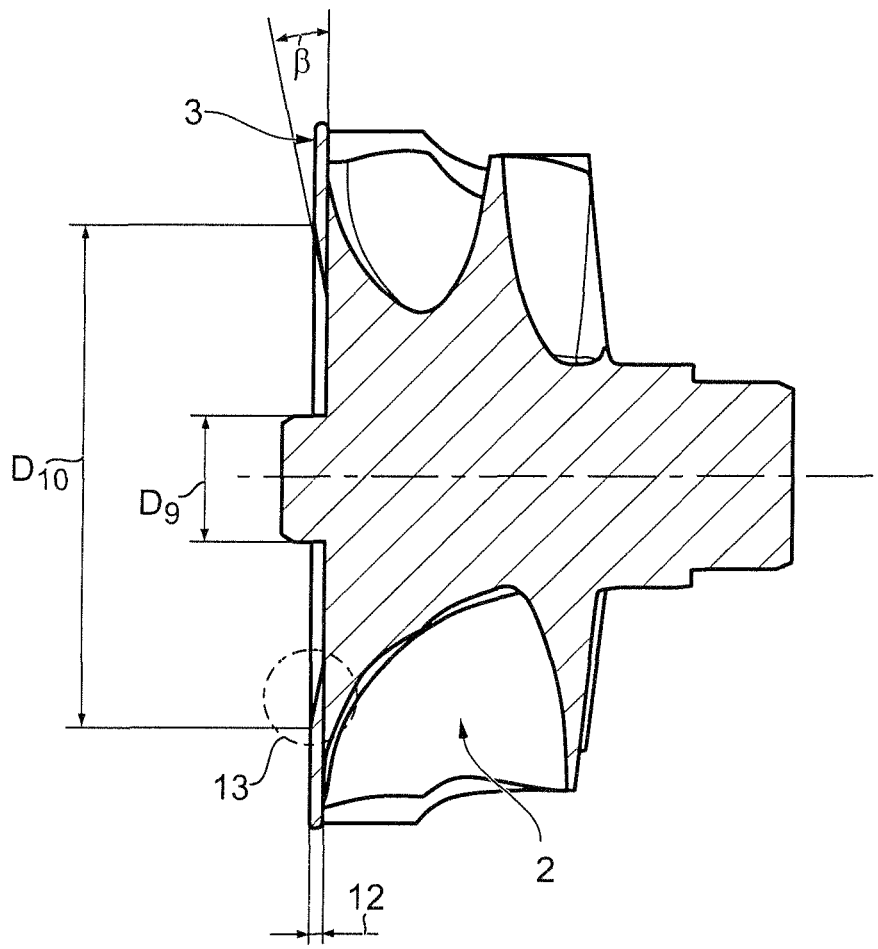
FIG. 11 shows an illustration, corresponding to FIG. 10, of a fourth design variant of the rotor wheel.

FIG. 11 illustrates the fourth design variant of the rotor wheel 2. The rotor wheel 2 has an oblique end region 13. The angle β of the end region 13 of the depression 12 may lie here in a range of 90° to 170°.

Figure 12:
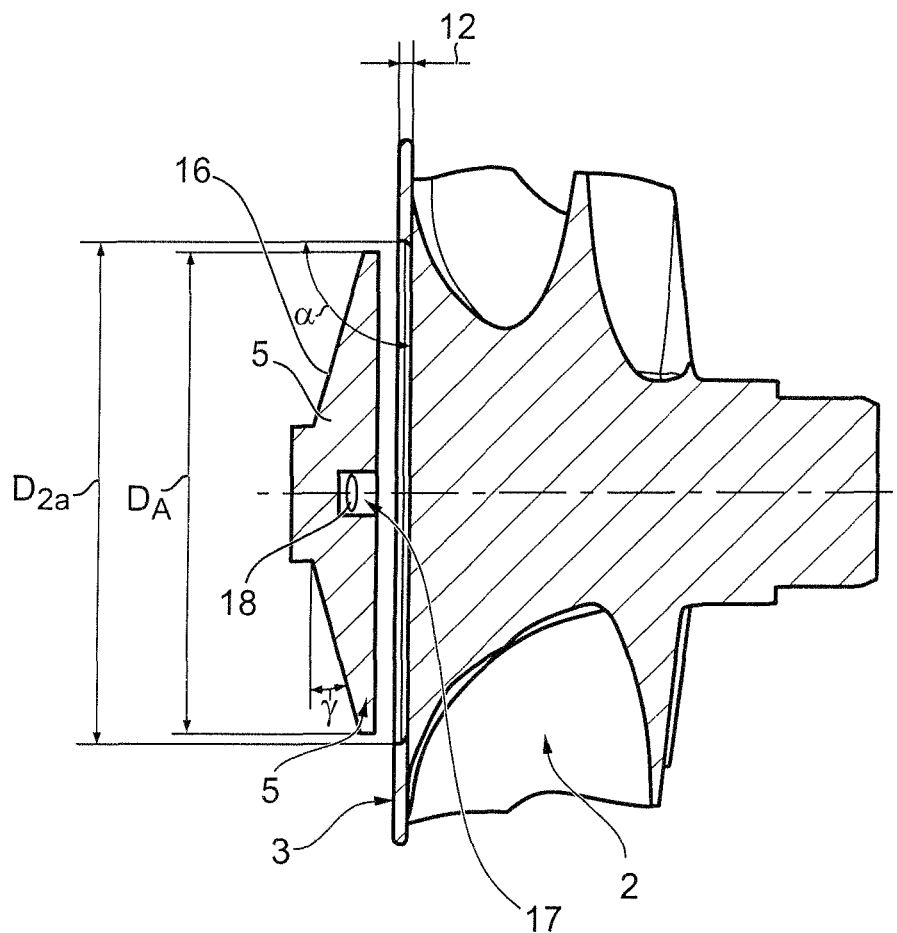
FIG. 12 shows an alternative geometric design of the intermediate piece.

An alternative version of the intermediate piece 5 with a slope 16 is illustrated in FIG. 12. The angle γ of the slope may vary between 0° and 45°.

The intermediate piece has no through-bore, but, instead, only a depression 17. This depression 17 may be used, for example, as a reservoir for a solder 18 in the form of powder or paste.

Figure 13:
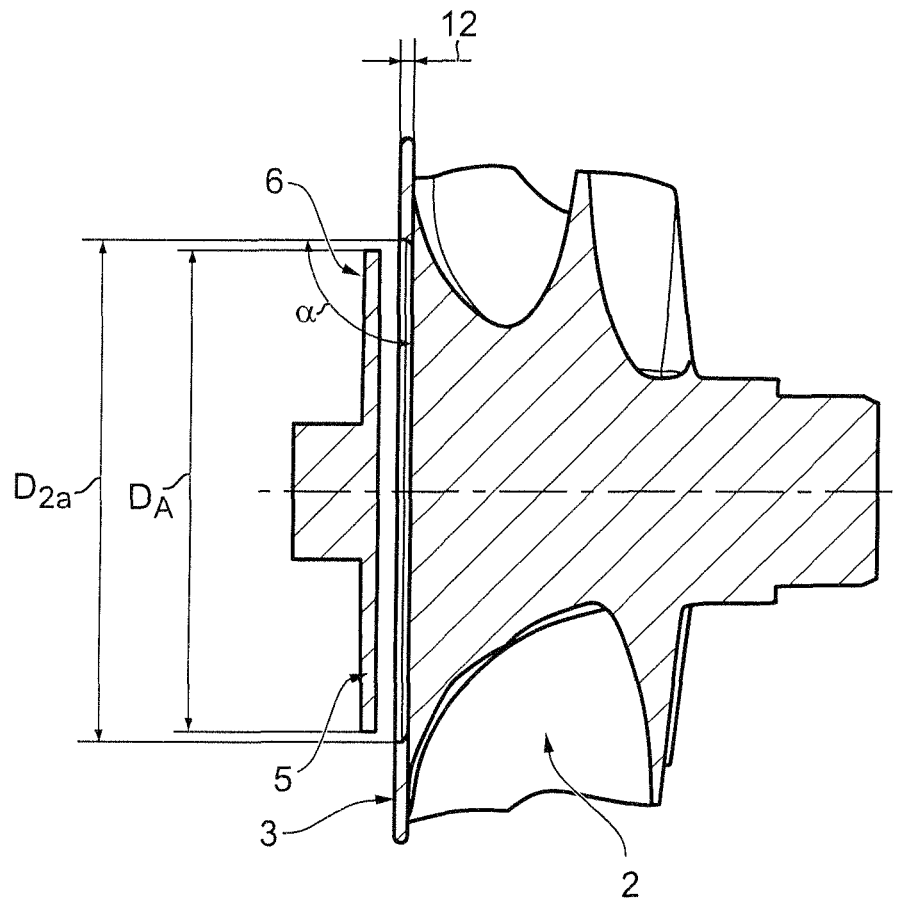
FIG. 13 shows a further alternative geometric design of the intermediate piece.

Furthermore, FIG. 13 illustrates an alternative version of the intermediate piece 5 which shows the intermediate piece without a bore.

Figure 14B:
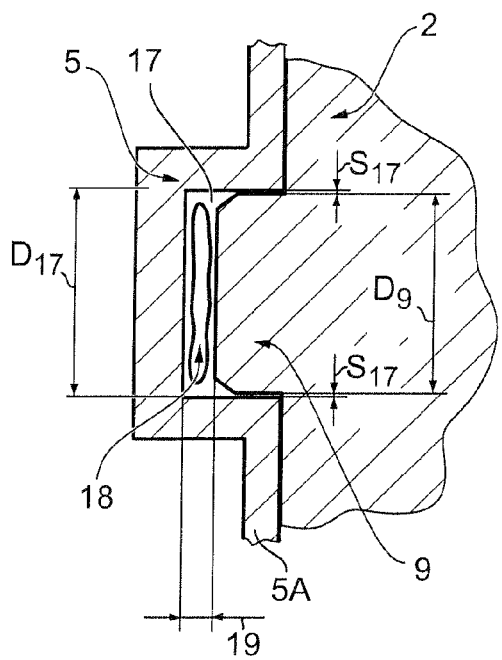

The alternative version of the intermediate piece 5, as described in FIG. 12, is illustrated in FIGS. 14A and 14B. An alternative process flow for producing the composite structure of intermediate piece 5 and rotor wheel 2 may appear as follows:

The intermediate piece 5 has a depression 17 which is not designed as through-bore. A solder in the form of a powder or a paste is introduced into the depression 17. The rotor wheel 2 has a centering tenon 9. The two components (5 and 2) are plugged one in the other. The depression 17 is to be designed such that the residual gap 19 remaining between the centering tenon 9 and the depression 17 when the two components 5 and 2 are plugged together is so large in terms of volume that it can receive the quantity of solder 18 necessary for soldering. The diameter $D_{17}$ of the depression and the diameter $D_9$ of the centering tenon 9 must be selected such that a soldering gap $S_{17}$ uniform on both sides is established. The composite structure of intermediate piece 5 and turbine wheel 2 is placed, for example, into a fixture, not illustrated in FIG. 14, for vacuum soldering in a furnace. There, for example, the temperature necessary for reaching the liquidous phase of the solder is obtained.

The desired soldering flux of the composite structure of intermediate piece 5 and turbine wheel 2 is illustrated diagrammatically in FIG. 15 in terms of the geometry of the intermediate piece 5 and rotor wheel 2 of the rotor 1 from FIG. 6, as components. However, this soldering flux may also be transferred to the composite structure of 5 and 2 described in FIG. 14. Both a radial 21 and axial 20 wetting of the two components (2 and 5) are to be considered advantageous.

The composite structure from FIG. 15 is illustrated as a reworked component in FIG. 16. After the intermediate piece 5 and the rotor wheel 2, as the two components, are connected to one another, as described in FIG. 15, for example by high-temperature soldering or soldering, using an electron beam for heating the components, a tie-up geometry for the shaft 4 is introduced by means of mechanical rework NA (for example, a lathe-turning and/or grinding process) on the intermediate piece 5, in order to connect said shaft later to the intermediate piece 5, for example by means of EB welding or friction welding. Moreover, depending on the cutting volume and cutting outlay, a checking cut may also take place over the outer marginal region 22 of the intermediate piece 5 and rotor wheel 2, as the two components. By means of such a cut, for example, it is possible to check whether a complete wetting of the components and a desired emergence of the solder from this region have occurred.

FIG. 17 illustrates a further version of the combination, illustrated in FIG. 5, of the shaft 4 and intermediate piece 5, which further version has a slope. The angle δ of this slope may vary between 0° and 45°.

By the intermediate piece 5 and the shaft 4, both consisting of a nickel-based or cobalt-based alloy, being combined into one component, a variant having reduced parts is produced. This advantageous configuration of the combination of shaft and intermediate piece may be produced, for example, in a forging process (forming process), extrusion process, lost-wax casting process or in the form of a component produced by the MIM method.

FIG. 18 illustrates a multi-part composite intermediate piece 25 produced by the MIM method. The composite intermediate piece 25 consists of at least two parts 23, 24 of different materials which are likewise produced by the MIM method and are then connected into one component 25 at the tie-up 26. An advantageous version of this composite intermediate piece combines a fraction 24 consisting of nickel-based or cobalt-based alloy with a fraction 23 consisting of a steel alloy.

FIG. 19 illustrates an alternative version of the multi-part composite intermediate piece 25 described in FIG. 18, which additionally has a slope on the fraction 27 consisting of a nickel-based or cobalt-based alloy, with an angle ε of 1°-45°.

A greater simplified diagrammatic version of the connection of the intermediate piece 5 to the rotor wheel 2, using an electron beam 31 for the uniform heating of the two components, is illustrated in FIG. 20. Irrespective of the various geometric designs of the intermediate piece 5 which are described in FIG. 1-6 and of the associated rotor wheel 2, FIG. 20 is intended to illustrate one possible electron beam soldering process. The intermediate piece 5 is located in a fixture 28, illustrated diagrammatically; the rotor wheel 2 is in a fixture 29, likewise illustrated diagrammatically. The introduction of heat by means of the beam 31 takes place advantageously on the intermediate piece 5 (with a focused or defocused EB beam). The beam parameters are to be selected as a function of the component shape and mass. A defined pretensioning 30 of the components ensures that the components are fixed in the correct position during the soldering operation, while at the same time the components rotate according to the arrow 32. The operation is maintained until a uniform full heating of the rotor wheel 2 and intermediate piece 5 (without a shaft), as the two parts to be connected, and the liquidous phase of the solder are achieved. A brief holding at a temperature above the melting temperature of the solder ensures that a complete wetting of the rotor wheel 2 and intermediate piece 5 as the two joining partners is achieved. Heating by means of the EB beam 31 takes place, in terms of the method, in a vacuum and therefore has the advantage that no undesirable reaction of the components to be connected occurs, in particular the reactivity of the TiAl with atmospheric oxygen is prevented.

An alternative version of the process described in FIG. 20 goes one step further and not only uses an intermediate piece 5 consisting of a nickel-based or cobalt-based alloy, but uses a version, shown in FIGS. 5 and 17, of a combination of shaft 4 and intermediate piece 5, both consisting of a nickel-based or cobalt-based alloy.

FIG. 21 shows an enlarged detail of the composite intermediate piece 5 with a slope 16 and of the rotor wheel 2. The slope 16 may, with an appropriate design, be used in order to absorb possible deformations or phase transformations in the material of the intermediate piece as a result of the locally high temperatures during heating by means of the EB beam 31 on the intermediate piece 5. With an appropriate design, deformations and adverse influences on the surface quality of the intermediate piece 5 due to the accumulation of material caused by the slope 16 can be absorbed. By means of a machining step, illustrated diagrammatically in FIG. 22, for example in the form of lathe turning, milling and/or grinding, the affected region can be removed. This may take place at the stage of obtaining the composite structure of intermediate piece 5 (without a shaft) and rotor wheel 2 or else on the ready-joined rotor according to the versions shown in FIGS. 1-6.

In summary, therefore, it has to be stated that, according to the invention, a rotor 1 of a turbomachine is provided, which, in the case of use in exhaust gas turbochargers, can be provided with a turbine wheel 2 exposed to high temperatures and consisting of an alloy which is based on a nonferrous metal alloy, in particular a γ-TiAl alloy. The rotor shaft or bearing shaft 4 may consist of a low-alloy or high-alloy steel (martensitic and/or austenitic) and of an intermediate piece 5, via which the turbine wheel 2 is connected rigidly to the rotor shaft 4 and via which the connected rotor 1 is fixed in the balancing plane 6 of the turbine wheel 2 on the wheel back 3. The connection between the turbine wheel and the intermediate piece 5 may be carried out by means of high-temperature soldering, using a high-temperature solder (Ni-based solder, AgCu solder, AgGa solder) in the furnace. In this case, the intermediate piece may consist of an Ni/Co-based alloy and it makes it possible to balance the rotor 1 in an operationally reliable way. The connection between the intermediate piece 5 and the rotor shaft 4 preferably consisting of steel may take place by means of a melt-welding process.

Furthermore, it is possible, alternatively, that the tie-up of the intermediate piece 5 to the rotor shaft 4 consisting of a martensitic or austenitic steel takes place by means of a CD welding or friction welding process.

Furthermore, it is possible that the connection between the turbine wheel 2 consisting of a nonferrous metal alloy, in particular a TiAl alloy, and the intermediate piece 5 consisting of an Ni/Co-based alloy may take place by means of CD welding, friction welding or a positive connection (such as, for example, pressing/shrinkage).

According to the principles of the method according to the invention, the balancing of the rotor 1 is carried out by applying at least one balancing mark in the balancing region 6.

The composite structure consisting of the turbine wheel 2 and the intermediate piece 5 may be heated by means of a high-frequency connecting operation under a protective gas atmosphere (argon scavenging) and connected by means of HT soldering material (soldering foil, soldering powder, soldering paste).

Alternatively, it is possible to connect the intermediate piece and the rotor shaft to one another in one piece, for example by means of an MIM process.

It is likewise possible, in an optimized version (for example, by means of adapted material properties for welding connection methods), to form the intermediate piece 5, multi-part, in an MIM process or to cast it by the lost-wax process or forge it.

Furthermore, by means of the method according to the invention, a reduction in the number of components necessary can be achieved by combining the components into one component, in which case, in particular, the rotor shaft and the intermediate piece may consist of an Ni/Co-based alloy.

In this last-mentioned variant, too, it is possible to employ a lost-wax casting method or a forging method.

The rotor wheel or turbine wheel may be provided on the wheel back by means of various methods, such as mechanical or ECM methods, with the depression explained above, which, in a particularly preferred embodiment, has the centering tenon, likewise already described.

The production of the turbine wheel may take place by means of a casting process in which the depression is generated within the casting framework.

In addition to the written disclosure of the invention, reference is hereby made explicitly to its graphic illustration in FIG. 1 to 22.

LIST OF REFERENCE SYMBOLS

1 Rotor
2 Rotor wheel (turbine wheel)
3 Wheel back
4 Rotor shaft
4A, B, C Shaft portions
5 Intermediate piece
5A Balancing plate (in one piece with the intermediate piece 5 or connectable to this)
6 Balancing region
7 (Tie-up) journal shaft
8 Cavity/bore
9 Centering tenon
10 Centering recess
11 Balancing tool
12 Depression
13 Margin of the depression/end region
14 Projection/elevation rotor wheel
15 Cavity
16 Slope on the intermediate piece
17 Depression of the intermediate piece
18 Diagrammatic illustration of solder
19 Remaining residual gap
20 Axial wetting
21 Radial wetting
22 Marginal region
23 Fraction consisting of a steel alloy
24 Fraction consisting of a nickel-based or cobalt-based alloy
25 Multi-part composite intermediate piece
26 Tie-up
27 Fraction consisting of a nickel-based or cobalt-based alloy with a slope
28 Fixture for intermediate piece (diagrammatic illustration)
29 Fixture for rotor wheel (diagrammatic illustration)
30 Pretension (force direction)
31 Electron beam
32 Direction of rotation/rotational movement of component during joining process
$D_{2a}$ Diameter value of the depression 12
$D_{4A}$, $D_{4B}$, $D_{4C}$ Diameter values of the shaft
$D_Z$, $D_A$, $D_{17}$ Diameter values of the intermediate piece
$D_{12a}$, $D_{12b}$, $D_9$;
$D_{10}$, $D_{11}$ Diameter values of the rotor wheel
$S_{17}$ Gap
D Direction of rotation of the balancing tool
α, β, γ, δ, ε Angle
NA Mechanical rework

The invention claimed is:

1. A method for producing a balanced rotor (1) of an exhaust gas turbocharger, comprising:
connecting a rotor shaft (4) to a rotor wheel (2) via an intermediate piece (5), wherein the rotor shaft has a largest diameter ($D_{4C}$), the rotor wheel (2) has a wheel back (3), the intermediate piece (5) is affixed to the wheel back (3) of the rotor wheel (2), and the intermediate piece (5) is provided with a disk-shaped balancing plate (5A) with an outside diameter ($D_A$) which is larger than the largest diameter ($D_{4C}$) of the rotor shaft (4); and
balancing of the rotor (1) by removal of balance material from the disk-shaped balancing plate (5A).

2. The method as claimed in claim 1, wherein the balancing material is removed from the circumference of the intermediate piece (5).

3. The method as claimed in claim 1,
   wherein the intermediate piece (5) is connected to the rotor wheel (2) by means of high-temperature soldering in a furnace under a vacuum or soldering by means of heating by an electron or laser beam or by means of a high-frequency heat source.

4. The method as claimed in claim 1,
   wherein the intermediate piece (5) is connected by means of an MIM method to the rotor wheel (2) produced by means of an MIM method.

5. The method as claimed in claim 4, wherein the intermediate piece (5) is a component produced by the MIM method or lost-wax casting method.

6. The method as claimed in claim 1,
   wherein the intermediate piece (5) is connected to the rotor wheel (2) by means of high-temperature soldering in a furnace under a vacuum or soldering by means of heating by an electron or laser beam or by means of a high-frequency heat source.

7. The method as claimed in claim 1, wherein the removal of material is performed by milling.

* * * * *